United States Patent
O'Bleness et al.

(10) Patent No.: US 8,631,206 B1
(45) Date of Patent: Jan. 14, 2014

(54) WAY-SELECTING TRANSLATION LOOKASIDE BUFFER

(75) Inventors: R. Frank O'Bleness, Tempe, AZ (US); Sujat Jamil, Gilbert, AZ (US); David E. Miner, Chandler, AZ (US); Joseph Delgross, Chandler, AZ (US); Tom Hameenanttila, Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 1105 days.

(21) Appl. No.: 12/194,841

(22) Filed: Aug. 20, 2008

Related U.S. Application Data

(60) Provisional application No. 60/974,302, filed on Sep. 21, 2007.

(51) Int. Cl.
*G06F 12/00* (2006.01)
*G06F 13/00* (2006.01)
*G06F 13/28* (2006.01)

(52) U.S. Cl.
USPC .......................................................... 711/128

(58) Field of Classification Search
USPC .......................................................... 711/128
See application file for complete search history.

(56) References Cited

U.S. PATENT DOCUMENTS

| | | | |
|---|---|---|---|
| 5,497,347 A * | 3/1996 | Feng | 365/189.07 |
| 6,014,732 A * | 1/2000 | Naffziger | 711/203 |
| 7,035,355 B2 * | 4/2006 | Lais et al. | 375/341 |
| 2008/0082721 A1 * | 4/2008 | Yu et al. | 711/3 |

* cited by examiner

*Primary Examiner* — Matthew Bradley
*Assistant Examiner* — Craig Goldschmidt

(57) ABSTRACT

Set-associative caches having corresponding methods and computer programs comprise: a data cache to provide a plurality of cache lines based on a set index of a virtual address, wherein each of the cache lines corresponds to one of a plurality of ways of the set-associative cache; a translation lookaside buffer to provide one of a plurality of way selections based on the set index of the virtual address and a virtual tag of the virtual address, wherein each of the way selections corresponds to one of the ways of the set-associative cache; and a way multiplexer to select one of the cache lines provided by the data cache based on the one of the plurality of way selections.

11 Claims, 5 Drawing Sheets

WAY-SELECTING TRANSLATION LOOKASIDE BUFFER

CROSS-REFERENCE TO RELATED APPLICATIONS

This application claims the benefit of U.S. Provisional Patent Application Ser. No. 60/974,302, filed on Sep. 21, 2007, the disclosure thereof incorporated by reference herein in its entirety.

BACKGROUND

The present invention relates generally to set-associative caches. More particularly, the present invention relates to a way-selecting translation lookaside buffer.

In high-performance cached-memory subsystems, single-cycle cache accesses are common. In such systems, the address tags and the associated data are read from all ways of the cache simultaneously. The incoming address is compared against all available address tags of the same set, providing a vector that is used to select which way of the available data corresponds to the request. In physically-addressed caches, the virtual-to-physical address translation typically occurs in parallel to the tag and data access. Generally, the critical timing path extends from the generation of the physical address (usually via a translation lookaside buffer), through the comparators associated with the address tags stored in the cache, to the switch-network (commonly referred to as the way multiplexer) that controls the output of the requested cache data. Implementation of a direct-mapped (that is, one-way) cache somewhat eases this timing constraint as the comparison is required for only a single tag to determine a hit condition, so no switch network needs to be traversed to access the data. But set-associative caches further exacerbate the timing constraint because a comparison is required to select the way of data.

For example, FIG. 1 shows a prior art set-associative cache 100. Cache 100 includes a data cache 102, a tag cache 104, a translation lookaside buffer (TLB) 106, a tag comparator 108, and a way multiplexer (MUX) 110. TLB 106 includes a content-addressable memory (TLB CAM) 116 and a random-access memory (TLB RAM) 118. A virtual address 120 is received that includes a set index 122 and a virtual tag 124.

Cache data 126 and cache tags 128 are read from all ways of data cache 102 and tag cache 104, respectively. TLB 106 provides a physical tag 130 of a physical address based on virtual tag 124. In particular, TLB CAM 116 provides a hit vector 134 based on virtual tag 124, and TLB RAM 118 provides physical tag 130 based on hit vector 134.

Tag comparator 108 compares physical tag 130 against all available address tags of the same set, providing a way selection 132 that way MUX 110 uses to select which way of cache data 126 corresponds to virtual address 120. The selected cache data is provided as data 136. In FIG. 1, the critical timing path includes TLB 106, tag comparator 108, and way MUX 110.

Various methods are used in an attempt to alleviate this timing burden. For example, a cache based on the un-translated virtual address does not fully contain this timing path—although the TLB must still provide permission checks. However, a virtual cache must be invalidated on context switch. In addition, many instruction set architectures require physically-addressed caches. A virtually-indexed, physically-addressed cache lessens this timing burden as the cache access occurs entirely in parallel with the address translation (again, save the permission checks). However, virtually-indexed caches suffer from address aliasing phenomena where multiple virtual addresses may be mapped to the same physical address. Additional hardware and/or software must be implemented to resolve the aliasing issue.

SUMMARY

In general, in one aspect, an embodiment features a set-associative cache comprising: a data cache to provide a plurality of cache lines based on a set index of a virtual address, wherein each of the cache lines corresponds to one of a plurality of ways of the set-associative cache; a translation lookaside buffer to provide one of a plurality of way selections based on the set index of the virtual address and a virtual tag of the virtual address, wherein each of the way selections corresponds to one of the ways of the set-associative cache; and a way multiplexer to select one of the cache lines provided by the data cache based on the one of the plurality of way selections.

Embodiments of the apparatus can include one or more of the following features. In some embodiments, the translation lookaside buffer comprises: a lookaside module to provide a hit vector based on the virtual tag of the virtual address; and a way module to provide the one of the plurality of way selections based on the set index of the virtual address and the hit vector. In some embodiments, the way module comprises: a memory, wherein the memory stores an array, wherein the array includes a plurality of rows, wherein each of the rows corresponds to one of a plurality of translation lookaside buffer entries for the set-associative cache, a plurality of columns, wherein the set index identifies one of a plurality of sets of the set-associative cache, and wherein each of the columns corresponds to one of the sets, and a plurality of cells, wherein each of the cells corresponds to one of the rows and one of the columns, wherein each of the cells includes one of the way selections; and wherein the way module selects one of the rows based on the hit vector, and selects one of the columns based on the set index. In some embodiments, each of the way selections comprises: a respective one-hot vector, wherein each respective one-hot vector includes a plurality of bits, and wherein each of the bits corresponds to one of the ways of the set-associative cache. In some embodiments, the lookaside module comprises: a content-addressable memory to provide the hit vector based on the virtual tag of the virtual address. In some embodiments, the lookaside module further comprises: a random-access memory to provide a physical tag of a physical address based on the hit vector. Some embodiments comprise a tag cache to provide a plurality of cache tags based on the set index of the virtual address, wherein each of the cache tags corresponds to one of the ways of the set-associative cache; and a tag comparator to provide a tag hit indicator based on the cache tags and the physical tag of the physical address, wherein the tag hit indicator indicates whether the set-associative cache includes valid data corresponding to the virtual address.

In general, in one aspect, an embodiment features a set-associative cache comprising: data cache means for providing a plurality of cache lines based on a set index of a virtual address, wherein each of the cache lines corresponds to one of a plurality of ways of the set-associative cache; translation lookaside buffer means for providing one of a plurality of way selections based on the set index of the virtual address and a virtual tag of the virtual address, wherein each of the way selections corresponds to one of the ways of the set-associative cache; and way multiplexer means for selecting one of the cache lines provided by the data cache based on the one of the plurality of way selections.

Embodiments of the apparatus can include one or more of the following features. In some embodiments, the translation lookaside buffer means comprises: lookaside means for providing a hit vector based on the virtual tag of the virtual address; and way means for providing the one of the plurality of way selections based on the set index of the virtual address and the hit vector. In some embodiments, the way means comprises: memory means for storing an array, wherein the array includes a plurality of rows, wherein each of the rows corresponds to one of a plurality of translation lookaside buffer means entries for the set-associative cache, a plurality of columns, wherein the set index identifies one of a plurality of sets of the set-associative cache, and wherein each of the columns corresponds to one of the sets, and a plurality of cells, wherein each of the cells corresponds to one of the rows and one of the columns, wherein each of the cells includes one of the way selections; and wherein the way means selects one of the rows based on the hit vector, and selects one of the columns based on the set index. In some embodiments, each of the way selections comprises: a respective one-hot vector, wherein each respective one-hot vector includes a plurality of bits, and wherein each of the bits corresponds to one of the ways of the set-associative cache. In some embodiments, the lookaside means comprises: content-addressable memory means for providing the hit vector based on the virtual tag of the virtual address. In some embodiments, the lookaside means further comprises: random-access memory means for providing a physical tag of a physical address based on the hit vector. Some embodiments comprise tag cache means for providing a plurality of cache tags based on the set index of the virtual address, wherein each of the cache tags corresponds to one of the ways of the set-associative cache; and tag comparator means for providing a tag hit indicator based on the cache tags and the physical tag of the physical address, wherein the tag hit indicator indicates whether the set-associative cache includes valid data corresponding to the virtual address.

In general, in one aspect, an embodiment features a method for a set-associative cache comprising: receiving a virtual address, wherein the virtual address includes a set index and a virtual tag; providing a plurality of cache lines based on the set index, wherein each of the cache lines corresponds to one of a plurality of ways of the set-associative cache; providing one of a plurality of way selections based on the set index and the virtual tag, wherein each of the way selections corresponds to one of the ways of the set-associative cache; and selecting one of the cache lines provided by the data cache based on the one of the plurality of way selections.

Embodiments of the method can include one or more of the following features. Some embodiments comprise providing a hit vector based on the virtual tag; and providing the one of the plurality of way selections based on the hit vector. Some embodiments comprise providing an array, wherein the array includes a plurality of rows, wherein each of the rows corresponds to one of a plurality of translation lookaside buffer entries for the set-associative cache, a plurality of columns, wherein the set index identifies one of a plurality of sets of the set-associative cache, and wherein each of the columns corresponds to one of the sets, and a plurality of cells, wherein each of the cells corresponds to one of the rows and one of the columns, wherein each of the cells includes one of the way selections; wherein providing one of a plurality of way selections includes selecting one of the cells; and wherein selecting one of the cells comprises selecting one of the rows based on the hit vector, and selecting one of the columns based on the set index. In some embodiments, each of the way selections comprises: a respective one-hot vector, wherein each respective one-hot vector includes a plurality of bits, and wherein each of the bits corresponds to one of the ways of the set-associative cache. In some embodiments, providing one of a plurality of way selections further comprises: providing a physical tag of a physical address based on the hit vector. Some embodiments comprise providing a plurality of cache tags based on the set index of the virtual address, wherein each of the cache tags corresponds to one of the ways of the set-associative cache; and providing a tag hit indicator based on the cache tags and the physical tag of the physical address, wherein the tag hit indicator indicates whether the set-associative cache includes valid data corresponding to the virtual address.

In general, in one aspect, an embodiment features a computer program for a set-associative cache comprising: instructions for providing a plurality of cache lines based on the set index of a virtual address, wherein each of the cache lines corresponds to one of a plurality of ways of the set-associative cache; instructions for providing one of a plurality of way selections based on the set index and the virtual tag, wherein each of the way selections corresponds to one of the ways of the set-associative cache; and instructions for selecting one of the cache lines provided by the data cache based on the one of the plurality of way selections.

Embodiments of the computer program can include one or more of the following features. Some embodiments comprise instructions for providing a hit vector based on the virtual tag; and instructions for providing the one of the plurality of way selections based on the hit vector. Some embodiments comprise instructions for providing an array, wherein the array includes a plurality of rows, wherein each of the rows corresponds to one of a plurality of translation lookaside buffer entries for the set-associative cache, a plurality of columns, wherein the set index identifies one of a plurality of sets of the set-associative cache, and wherein each of the columns corresponds to one of the sets, and a plurality of cells, wherein each of the cells corresponds to one of the rows and one of the columns, wherein each of the cells includes one of the way selections; wherein the instructions for providing one of a plurality of way selections include instructions for selecting one of the cells; and wherein the instructions for selecting one of the cells comprise instructions for selecting one of the rows based on the hit vector, and instructions for selecting one of the columns based on the set index. In some embodiments, each of the way selections comprises: a respective one-hot vector, wherein each respective one-hot vector includes a plurality of bits, and wherein each of the bits corresponds to one of the ways of the set-associative cache. In some embodiments, the instructions for providing one of a plurality of way selections further comprise: instructions for providing a physical tag of a physical address based on the hit vector. Some embodiments comprise instructions for providing a plurality of cache tags based on the set index of the virtual address, wherein each of the cache tags corresponds to one of the ways of the set-associative cache; and instructions for providing a tag hit indicator based on the cache tags and the physical tag of the physical address, wherein the tag hit indicator indicates whether the set-associative cache includes valid data corresponding to the virtual address.

In general, in one aspect, an embodiment features a computer-readable medium embodying an array, the array comprising: a plurality of rows, wherein each of the rows corresponds to one of a plurality of translation lookaside buffer entries for a set-associative cache; a plurality of columns, wherein each of the columns corresponds to one of a plurality of sets of the set-associative cache; and a plurality of cells, wherein each of the cells corresponds to one of the rows and one of the columns, wherein each of the cells includes a respective way selection, and wherein each of the way selections corresponds to one of a plurality of ways of the set-associative cache.

Embodiments of the computer-readable media can include one or more of the following features. In some embodiments, each of the way selections comprises: a respective one-hot vector, wherein the one-hot vector includes a plurality of bits, and wherein each of the bits corresponds to one of the ways of the set-associative cache.

The details of one or more implementations are set forth in the accompanying drawings and the description below. Other features will be apparent from the description and drawings, and from the claims.

Figure 1:
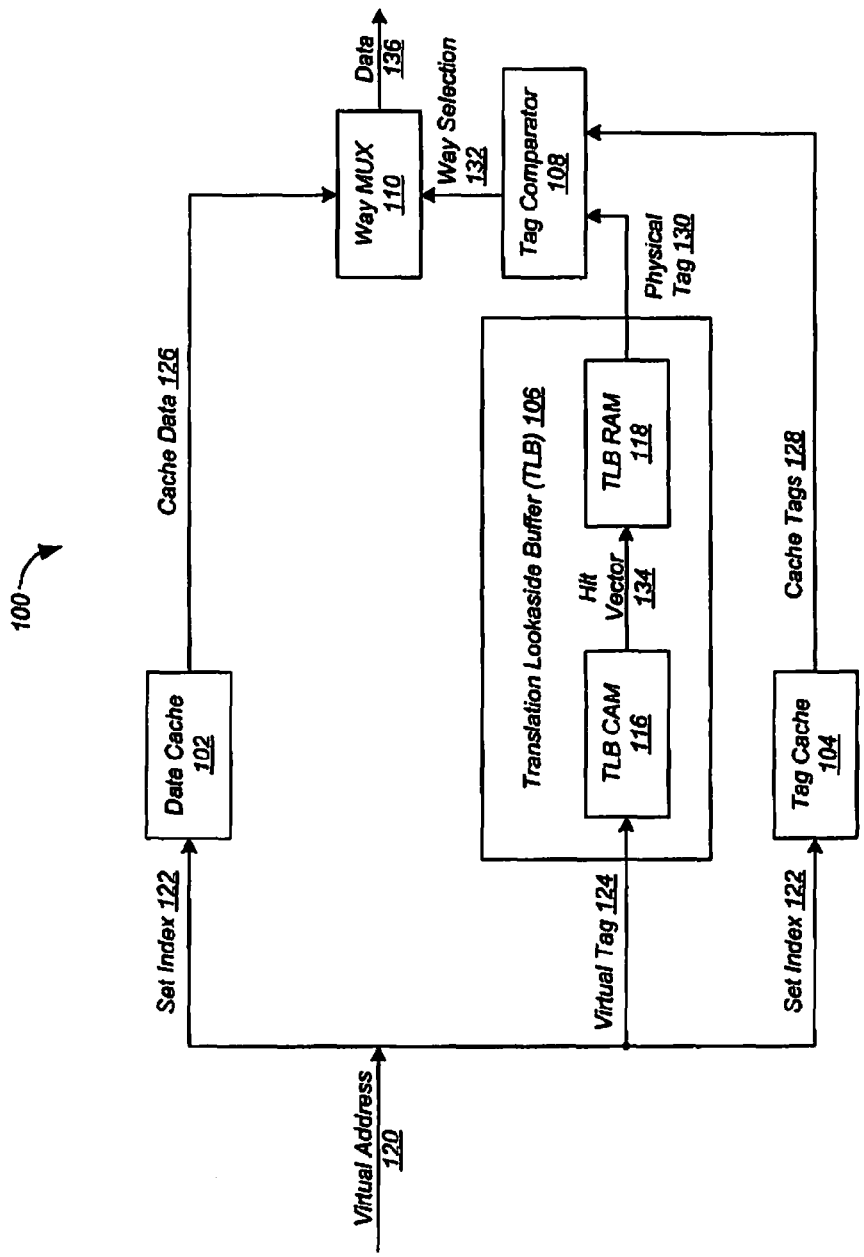
FIG. 1 shows a prior art set-associative cache.

The leading digit(s) of each reference numeral used in this specification indicates the number of the drawing in which the reference numeral first appears.

DETAILED DESCRIPTION

The present disclosure describes techniques that alleviate the timing burdens experienced by prior art set-associative caches, in particular by removing the tag compare process entirely. As described below, a per-set way-mux selection is stored for each row in the translation lookaside buffer (TLB). When the TLB is accessed for address translation, the way-mux selection for the selected set is immediately available to select the correct cache data set because the address tag comparison is not needed. As a result, the tag cache storing the address tags may be removed entirely.

Figure 2:
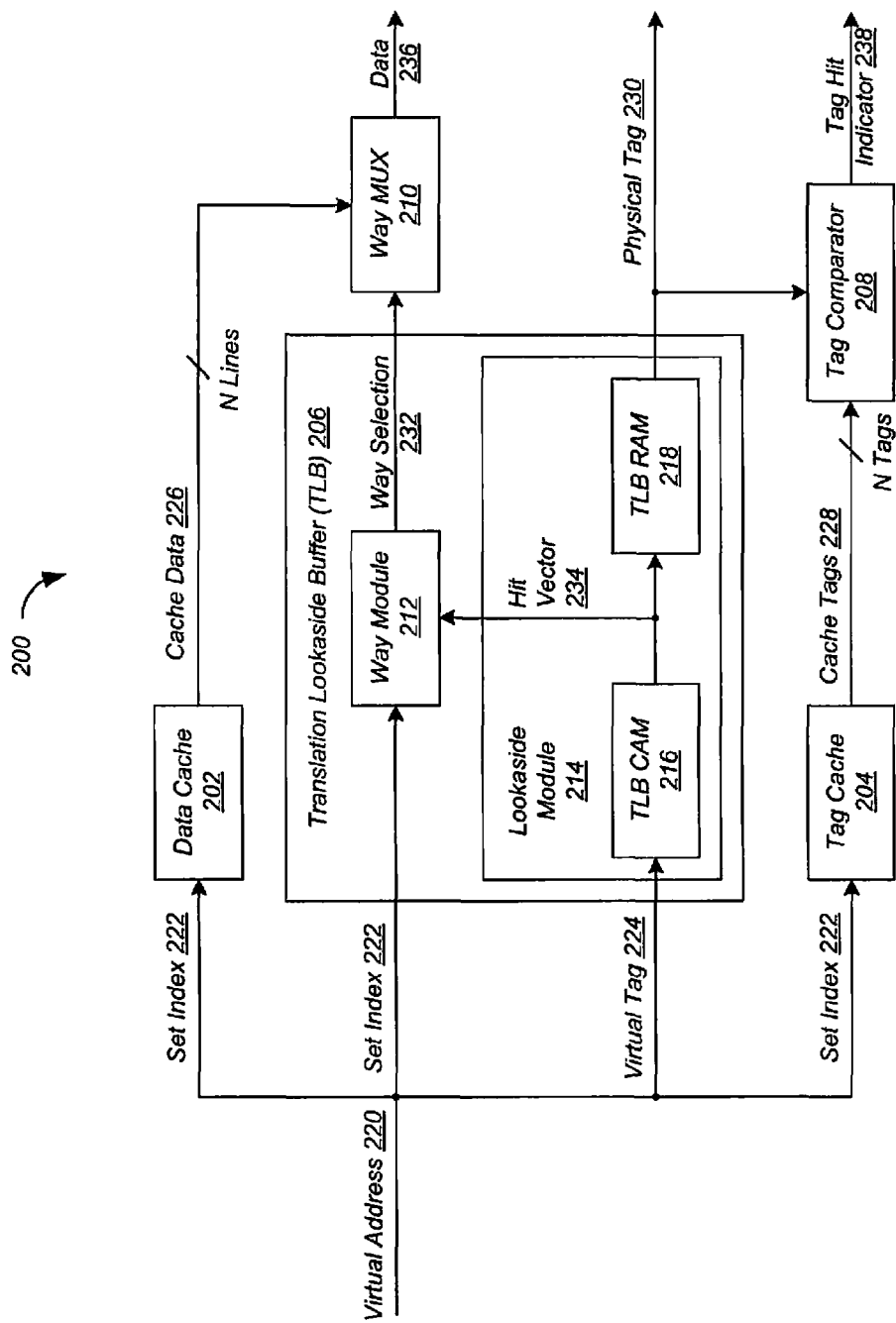
FIG. 2 shows a set-associative cache according to some embodiments.

FIG. 2 shows a set-associative cache 200 according to some embodiments. Although in the described embodiments, the elements of set-associative cache 200 are presented in one arrangement, other embodiments may feature other arrangements. For example, the elements of set-associative cache 200 can be implemented in hardware, software, or combinations thereof.

Referring to FIG. 2, cache 200 includes a data cache 202, a translation lookaside buffer (TLB) 206, and a way multiplexer (MUX) 210. TLB 206 includes a way module 212 and a lookaside module 214. Lookaside module 214 includes a content-addressable memory (TLB CAM) 216 and a random-access memory (TLB RAM) 218. Cache 200 can be employed in various data processing systems, for example in a general-purpose computer and the like.

Figure 3:
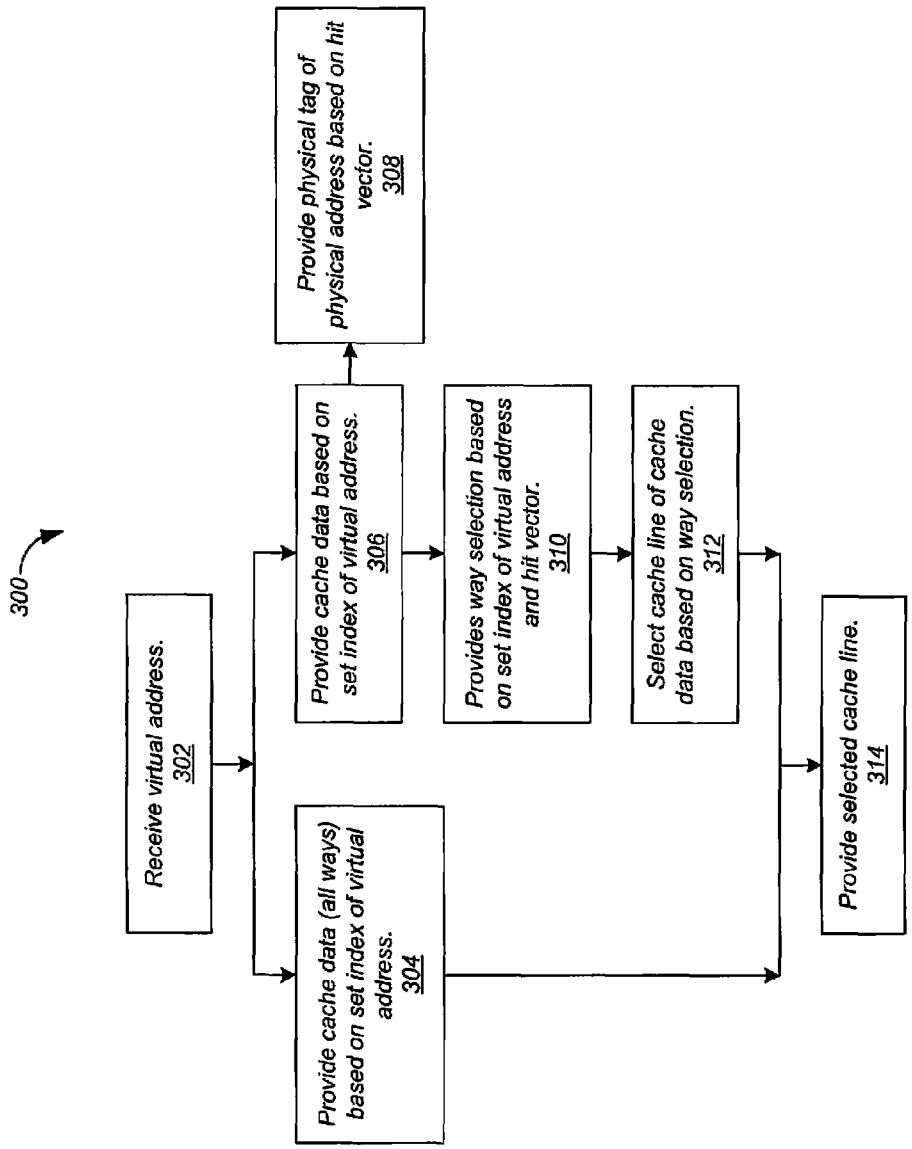
FIG. 3 shows a process for the cache of FIG. 2 according to an embodiment of the present invention.

FIG. 3 shows a process 300 for cache 200 of FIG. 2 according to an embodiment of the present invention. Although in the described embodiments, the elements of process 300 are presented in one arrangement, other embodiments may feature other arrangements. For example, in various embodiments, some or all of the steps of process 300 can be executed in a different order, concurrently, and the like.

Figure 4:
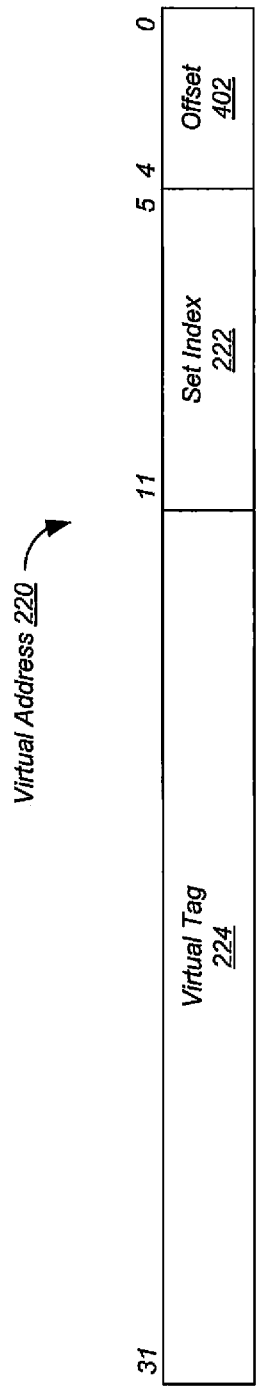
FIG. 4 shows detail of a virtual address according to one example.

Referring to FIG. 3, cache 200 receives a virtual address 220 (step 302). FIG. 4 shows detail of virtual address 220 according to one example. Referring to FIG. 4, virtual address 220 includes an offset 402, followed by a set index 222, followed by a virtual tag 224. In the example of FIG. 4, virtual address 220 is a 32-bit binary number, where offset 402 occupies bits 0-4, set index 222 occupies bits 5-11, and virtual tag 224 occupies bits 12-31. Of course other numbers of bits can be used, depending on the organization of the cache.

Referring again to FIG. 3, data cache 202 provides cache data 226 based on set index 222 of virtual address 220 (step 304). Cache data 226 includes a plurality of cache lines N. Each of the N cache lines corresponds to one of the N ways of set-associative cache 200. In parallel, TLB 206 provides way selection 232 and physical tag 230 of a physical address based on set index 222 and virtual tag 224 of virtual address 220.

In particular, lookaside module 214 provides a hit vector 234 and physical tag 230 based on virtual tag 224. Content-addressable memory (CAM) 216 provides hit vector 234 based on virtual tag 224 (step 306). CAM 216 includes M entries each storing a respective virtual page number. In one embodiment, M=8, although of course other values can be used.

When virtual tag 224 matches one of the virtual page numbers, CAM 216 provides hit vector 234, which is an index of the row storing the virtual page number. For example, hit vector 234 can be implemented as an M-bit one-hot vector where each bit represents one of the M rows of CAM 216. When virtual tag 224 matches none of the virtual page numbers in CAM 216, hit vector 234 can be all zeros.

Random-access memory (RAM) 218 provides physical tag 230 based on hit vector 234 (step 308). RAM 218 includes M rows each storing a respective physical page number. When hit vector 234 is non-zero, RAM 218 provides the physical page number stored in the row indexed by hit vector 234 as physical tag 230.

Way module 212 provides way selection 232 based on set index 222 of virtual address 220 and hit vector 234 (step 310), as described in more detail below. In particular, way module 212 provides one of a plurality of stored way selections 232. Each of the way selections 232 corresponds to one of the N ways of set-associative cache 200.

Way MUX 210 selects one of the N cache lines of cache data 226 based on way selection 232 (step 312), and provides the selected cache line as data 236 (step 314). Referring again to FIG. 2, note that the critical timing path includes only data cache 202 and way MUX 110 because no tag comparison is required.

In some embodiments, a tag comparison can be included, for example to optimize eviction policies for write-back caches, to support snooping of the physical address for cache-coherent systems, and the like. In such embodiments, referring again to FIG. 2, cache 200 can include a tag cache 204 and a tag comparator 208. Tag cache 204 provides cache tags 228 based on set index 222. Tag comparator 208 provides a tag hit indicator 238 based on cache tags 228 and physical tag 230. Tag hit indicator 238 can be a binary value that indicates whether a cache hit occurred.

Figure 5:
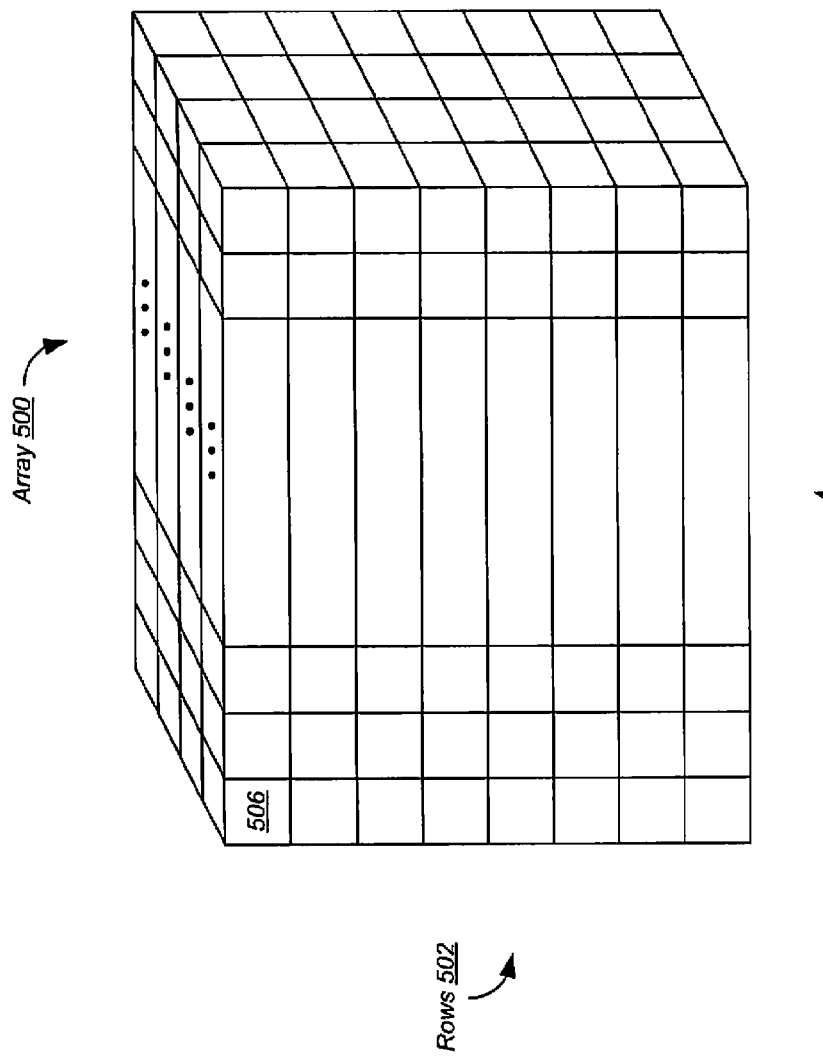
FIG. 5 shows detail of the way module of FIG. 2 according to one embodiment.

FIG. 5 shows detail of way module 212 according to one embodiment. Way module 212 stores an array 500. Array 500 includes M rows 502, each corresponding to one of the M rows of lookaside module 214, and K columns 504, each corresponding to one of the K sets of set-associative cache 200. In the example virtual address of FIG. 4, set index 222 is 7 bits, so $K=2^7=128$.

Array 500 also includes MK cells 506 each corresponding to one of rows 502 and one of columns 504. Each cell 506 stores a respective way selection 232. Each way selection 232 corresponds to one of the N ways of set-associative cache 200. To select a cell 506, way module 212 selects one of rows 502 based on hit vector 234, and selects one of columns 504 based on set index 222.

Each way selection 232 can be stored as a one-hot vector, as shown in FIG. 5, where each bit of the vector corresponds to one of the N ways of set-associative cache 200. Of course, way selections 232 can be stored in coded form using fewer bits. In such embodiments, way MUX 110 can include a decoder to decode way selections 232.

Embodiments disclosed herein possess several advantages over prior art set-associative caches. First, the time-consuming and power-hungry tag comparison function can be removed, thereby allowing faster cache access times. Second, the tag cache can be removed. Any additional area required by additional TLB way MUX selects is likely far less than area required by the tag cache, thereby reducing cost. Third, significant power savings can be achieved because the tag comparator, the tag cache, or both have been removed. Fourth, the disclosed techniques are not speculative, but instead reveal the exact location of the requested data. Fifth, any conventional replacement technique can be used with the disclosed embodiments In practice, performance gains achieved by the disclosed embodiments are sensitive to TLB size and page size. For example, a TLB miss implies a cache miss even if the applicable data actually exists, physically, in the cache location. Therefore, embodiments are likely more suited to smaller cache sizes and/or require larger TLBs, that is, TLBs with more rows. Further, as TLB row replacements implicitly cause applicable cache replacements, dirty data associated with an evicted TLB location (such as the replaced physical page) must be flushed. While this policy could be enforced by a dedicated flushing routine, various embodiments are more amenable to caches that are not required to maintain the dirty-status of cached data, for example such as read-only caches, write-through caches, instruction caches, and the like.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the scope of the invention. For example, the TLB physical implementation may be structured differently than the CAM/RAM organization shown in FIG. 2. The total cache size, associativity and line-size may vary significantly, affecting set address and offset. The TLB may be implemented in more than one level, for example as a direct-mapped 8-entry "local" TLB backed by a 2-way 64-entry "main" TLB, where both or either may implement way selection. Accordingly, other implementations are within the scope of the following claims.

What is claimed is:

1. A set-associative cache comprising:
a data cache configured to provide a plurality of cache lines in response to a set index of a virtual address, wherein each of the cache lines corresponds to one of a plurality of ways of the set-associative cache;
a translation lookaside buffer configured to provide one of a plurality of way selections in response to (i) the set index of the virtual address and (ii) a virtual tag of the virtual address, wherein each of the way selections corresponds to one of the ways of the set-associative cache, and wherein the translation lookaside buffer comprises:
a lookaside module configured to provide a hit vector in response to the virtual tag of the virtual address; and
a way module configured to store an array of way selections,
wherein a first dimension of the array is indexed by the hit vector,
wherein a second dimension of the array is indexed by the set index of the virtual address, and
wherein the way module is further configured to retrieve the one of the plurality of way selections from the array (i) in response to each of the set index of the virtual address and the hit vector, and (ii) independently of a physical tag of a physical address corresponding to the virtual address; and
a way multiplexer configured to select one of the cache lines provided by the data cache in response to the one of the plurality of way selections retrieved by the way module.

2. The set-associative cache of claim 1, wherein the way module comprises:
a memory configured to store the array, wherein the array includes
a plurality of rows arranged along the first dimension, wherein each of the rows corresponds to one of a plurality of translation lookaside buffer entries for the set-associative cache,
a plurality of columns arranged along the second dimension, wherein the set index identifies one of a plurality of sets of the set-associative cache, and wherein each of the columns corresponds to one of the sets, and
a plurality of cells, wherein each of the cells corresponds to one of the rows and one of the columns, wherein each of the cells includes one of the way selections; and
wherein the way module is configured to select one of the rows in response to the hit vector, and to select one of the columns in response to the set index.

3. The set-associative cache of claim 2, wherein the hit vector comprises a one-hot bit vector, and wherein each bit of the one-hot bit vector corresponds to one of the rows of the array.

4. The set-associative cache of claim 2, wherein the lookaside module comprises:
   a content-addressable memory configured to provide the hit vector in response to the virtual tag of the virtual address.

5. The set-associative cache of claim 4, wherein the lookaside module further comprises:
   a random-access memory configured to provide the physical tag of the physical address in response to the hit vector.

6. The set-associative cache of claim 5, further comprising:
   a tag cache configured to provide a plurality of cache tags in response to the set index of the virtual address, wherein each of the cache tags corresponds to one of the ways of the set-associative cache; and
   a tag comparator configured to provide a tag hit indicator in response to (i) the cache tags and (ii) the physical tag of the physical address, wherein the tag hit indicator indicates whether the set-associative cache includes valid data corresponding to the virtual address.

7. A method for controlling a set-associative cache, the method comprising:
   receiving a virtual address, wherein the virtual address includes a set index and a virtual tag;
   providing a plurality of cache lines in response to the set index of the virtual address, wherein each of the cache lines corresponds to one of a plurality of ways of the set-associative cache;
   providing one of a plurality of way selections in response to (i) the set index of the virtual address and (ii) the virtual tag of the virtual address, wherein each of the way selections corresponds to one of the ways of the set-associative cache;
   providing a hit vector in response to the virtual tag of the virtual address;
   storing an array of way selections, wherein a first dimension of the array is indexed by the hit vector, and wherein a second dimension of the array is indexed by the set index of the virtual address;
   retrieving the one of the plurality of way selections from the array (i) in response to each of the set index of the virtual address and the hit vector, and (ii) independently of a physical tag of a physical address corresponding to the virtual address; and
   selecting one of the plurality of cache lines in response to the one of the plurality of way selections.

8. The method of claim 7, wherein:
   the array includes
      a plurality of rows arranged along the first dimension, wherein each of the rows corresponds to one of a plurality of translation lookaside buffer entries for the set-associative cache,
      a plurality of columns arranged along the second dimension, wherein the set index of the virtual address identifies one of a plurality of sets of the set-associative cache, and wherein each of the columns corresponds to one of the sets, and
      a plurality of cells, wherein each of the cells corresponds to one of the rows and one of the columns, wherein each of the cells includes one of the way selections;
   retrieving the one of the plurality of way selections comprises selecting one of the cells; and
   selecting one of the cells comprises
      selecting one of the rows in response to the hit vector, and
      selecting one of the columns in response to the set index of the virtual address.

9. The method of claim 8, wherein the hit vector comprises a one-hot bit vector, and wherein each bit of one-hot bit vector corresponds to one of the rows of the array.

10. The method of claim 7, further comprising providing the physical tag of the physical address in response to the hit vector.

11. The method of claim 10, further comprising:
   providing a plurality of cache tags in response to the set index of the virtual address, wherein each of the cache tags corresponds to one of the ways of the set-associative cache; and
   providing a tag hit indicator in response to the cache tags and the physical tag of the physical address, wherein the tag hit indicator indicates whether the set-associative cache includes valid data corresponding to the virtual address.

* * * * *